United States Patent Office 3,787,421
Patented Jan. 22, 1974

3,787,421
SUBSTITUTED 6-CARBOXY-1,2-BENZISO-
THIAZOLE-1,1-DIOXIDES
Peter Werner Feit, Gentofte, and Ole Bent Tvaermose
Nielsen, Vanlose, Denmark, assignors to Lovens
Kemiske Fabrik Produktionsaktieselskab, Ballerup,
Denmark
No Drawing. Filed June 16, 1971, Ser. No. 153,878
Claims priority, application Great Britain, June 30, 1970,
31,718/70
Int. Cl. C07d 91/12
U.S. Cl. 260—294.8 C    29 Claims

ABSTRACT OF THE DISCLOSURE

The invention relates to a series of new compounds, their salts and esters and to methods for the preparation of the compounds having the general formula:

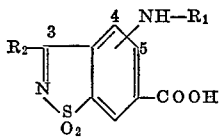

in which the NH-$R_1$ group can be in the 4- or 5-position, $R_1$ represents an aliphatic radical with from 3 to 8 carbon atoms in the chain, or a mononuclear aromatically or a mononuclear heterocyclically substituted methyl or ethyl group, and $R_2$ represents an unsubstituted or substituted phenyl group.

---

The compounds of the invention possess pronounced diuretic and saluretic activities.

This invention relates to a series of new compounds, their salts and esters and to methods for the preparation of the compounds having the general formula:

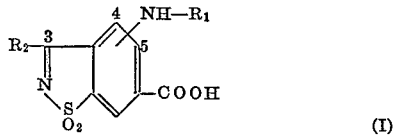
(I)

in which the NH-$R_1$ group can be in the 4- or 5-position, $R_1$ represents an aliphatic radical with from 3 to 8 carbon atoms in the chain, or a mononuclear aromatically or a mononuclear heterocyclically substituted methyl or ethyl group, and $R_2$ represents an unsubstituted or substituted phenyl group.

In particular, $R_1$ may represent a straight or branched alkyl radical, having from 3 to 8 carbon atoms, e.g. a propyl, isopropyl, butyl, isobutyl, or tert. butyl radical, or one of the different isomeric pentyl, hexyl, or heptyl radicals, an alkenyl or alkynyl radical, e.g. an allyl, or propargyl radical. In the mononuclear aromatically or mononuclear heterocyclically substituted aliphatic radicals the aromatic part of the radical can be an unsubstituted or substituted phenyl radical and the heterocyclic part of the radical can be a monocyclic radical with one or more oxygen, sulphur and nitrogen atoms as ring members, e.g. 2-, 3-, or 4-pyridyl, 2- or 3-furyl or -thienyl, thiazolyl, imidazolyl. Illustrative examples of such aromatically or heterocyclically substituted aliphatic radicals are benzyl, 1- or 2-phenylethyl, furyl-methyl and thienyl-methyl or the corresponding ethyl radicals.

The substituents $R_1$ and $R_2$ of Formula can be substituted in different positions with different groups such as one or more halogen atoms e.g. chlorine or bromine atoms, lower alkyl, halo-lower alkyl, e.g. trifluoromethyl, chloromethyl, 2-chloroethyl, dichloromethyl, trichloromethyl or bromomethyl; carboxy, carb(lower)alkoxy or carbamyl radicals; di-lower alkylamino radicals, hydroxy groups, which may be etherified, e.g. lower alkoxy such as methoxy, ethoxy, n-propoxy, isopropoxy, n-butoxy or isobutoxy; or esterified with lower aliphatic carboxylic acids, such as lower alkanoic acids, e.g. acetic, propionic or pivalic acid, lower alkenoic acids, e.g. acrylic or methacrylic acid, lower aliphatic dicarboxylic acids, e.g. oxalic, malonic, succinic, glutaric, adipic, maleic or fumaric acid or their halfesters with lower alkanols, e.g. methanol or ethanol; or etherified mercapto groups such as methylthio, ethylthio, isopropylthio, butylthio or isobutylthio.

Whenever the expression "lower alkyl" is used in the foregoing and in the following it stands for a straight or branched alkyl radical with from 1 to 6 carbon atoms in the chain.

Among the preferred compounds of the invention mention may be made of compounds in which $R_1$ in Formula I stands for alkyl with from 3 to 5 carbon atoms in the carbon chain, or for benzyl, furylmethyl or thienylmethyl, these examples, however, not being considered limiting for the invention.

The salts of the compounds of the invention are pharmaceutically acceptable salts, and include, for example, alkali metal salts, alkaline earth metal salts, the ammoninum salt, or amine salts formed, for instance, from mono-, di- or trialkanolamines or cyclic amines. The esters of the compounds are preferably derived from lower aliphatic alcohols, cyanomethanol and benzylalcohols.

In animal experiments with dogs as test animals the compounds of the invention possess an outstanding diuretic and saluretic activity. Furthermore was observed a very favorable ratio between the excretion of sodium ions and potassium ions which in connection with a low toxicity make the present compounds particularly valuable.

The present compounds are effective after oral, enteral or parenteral administration, and are in human or veterinary practice preferably prescribed in the form of tablets, pills, dragees, or capsules containing the free acid or salts thereof with atoxic bases, or the esters thereof, mixed with carriers and/or auxiliary agents.

Salts, which are soluble in water, may with advantage be administered by injection. The compounds of the invention are useful in the treatment of oedematous conditions, e.g. cardiac, hepatic, renal, lung and brain oedema, or oedematous conditions during pregnancy, and of pathological conditions which produce an abnormal retension of the electrolytes of the body, and in the treatment of hypertension.

According to preliminary trials it has been found that the compounds and their salts should be administered in dosage units of from 0.04 mg. to 0.2 mg. per kg. of body weight, once, twice or thrice a day, calculated as the free acid of Formula I, to achieve the desired activity, the prescription, however, always being with due regard to the condition of the patient and under the direction of a medical practitioner.

By the term "dosage unit" is meant a unitary, i.e. a single dose which is capable of being administered to a patient, and which may be readily handled and packed, remaining as a physically stable unit dose comprising either the active material as such or a mixture of it with solid or liquid pharmaceutical diluents or carriers.

If the composition is to be injected, a sealed ampoule, a vial or a similar container may be provided containing a parenterally acceptable aqueous or oily injectable solution or dispersion of the active material as the dosage unit.

In the treatment of heart failure and hypertension the dosage unit may in addition contain other active components.

It is another object of the invention to provide a method of producing the compounds of the invention.

In the method of the invention a compound of the general formula; or one of its esters:

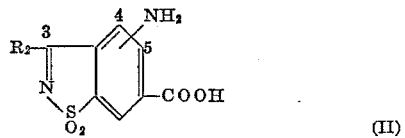

(II)

in which $R_2$ has the meaning hereinbefore defined is alkylated with a compound of the general formula $R_1X$ in which $R_1$ has the meaning hereinbefore defined and X stands for halogen, preferably chlorine or bromine, or a hydroxy group, a hydroxylsulphonyloxy group, a $R_1$-oxysulphonyloxy group, or an alkyl- or arylsulphonyloxy group, whereafter the compounds of Formula I thus formed is isolated, and if desired, the carboxylic acid group is subsequently liberated, or optionally the carboxylic acid group can subsequently be esterified.

The reactions above are well known to the man skilled in the art.

The compounds of Formula II are described in our copending United States patent application Ser. No. 153,879, filed June 16, 1971 for certain Sulfamylbenzoic Acids, Esters Thereof, and Pharmaceutically Acceptable Salts Thereof."

Depending on the position of the amino group attached to the benzene nucleus they are provided by different methods. Thus, when the amino group is placed in the 4-position, 4-carbethoxy-2,6-dinitrobenzoic acid is used as starting material in a preferred route for the preparation of the compound of Formula II. This starting material is transformed into the corresponding acid chloride by treatment with a chlorinating agent, such as thionyl chloride or phosphorous chlorides. By treatment of this acid chloride with benzene and aluminum chloride under well-known conditions and isolation of the reaction product, ethyl 4-benzoyl-3,5-dinitrobenzoate is obtained. By replacing the benzene in the reaction above with substituted benzene the corresponding ethyl 4-(substituted benzoyl)-3,5-dinitrobenzoate is obtained.

After saponification to the corresponding free acid, this is partially reduced by means of a reducing agent, such as an alkali dithionite whereby only one of the nitro groups is converted into an amino group. The obtained 5-amino-4-benzoyl-3-nitro-benzoic acid is subjected to a Meerwein-reaction, whereby 4-benzoyl-5 - chlorosulphonyl-3-nitrobenzoic acid is obtained, which after treatment with ammonia yields the corresponding 5-sulphonamide of the general formula:

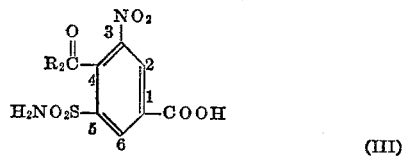

(III)

in which $R_2$ has the meaning hereinbefore defined. After a further reduction of the nitro group in the 3-position, for instance with an excess of sodium-dithionite, and at slightly elevated temperature, a ring closure takes place preferably under acidic conditions and the compound of Formula II is obtained, having the amino group in the 4-position.

The compounds of Formula II in which the amino group is placed in the 5-position are appropriately obtained from 4-acetamino-2-chloro-5-nitro-benzoic acid as starting material. This compound is converted into the corresponding benzoyl chloride by treatment with a chlorinating agent such as thionyl chloride which by treatment with benzene and aluminum chloride is converted into the corresponding 4-acetamino-2-chloro-5-nitrobenzophenone. By an acidic hydrolysis 4-amino-2-chloro-5-nitrobenzophenone is obtained.

By diazotation and treatment with cuprous cyanide the amino group of the above mentioned compound is converted into a nitril, which again by an acid hydrolysis is transferred into the corresponding acid. This 4-benzoyl-5-chloro-2-nitrobenzoic acid is by reacting with benzylmercaptane converted into the corresponding 5-benzylthio compound which by an oxydative chlorination using chlorine in, e.g. acetic acid yields the 5-chlorosulphonyl derivative. By treatment of this reaction product with ammonia below or at room temperature an intermediate is formed which without isolation and under simultaneous ring closure is converted into 6-carboxy-5-nitro-3-phenyl-1,2-benzisothiazole-1,1-dioxide. The nitro group of this compound is reduced to an amino group by a mild reduction for instance with ferrosulphate in ammonium hydroxide, whereby the compound of Formula II is obtained. The substituted 3-phenyl-derivatives are prepared in analogous reactions.

In the alternative, compounds of Formula I are obtained from compounds of the general formula; or one of its esters:

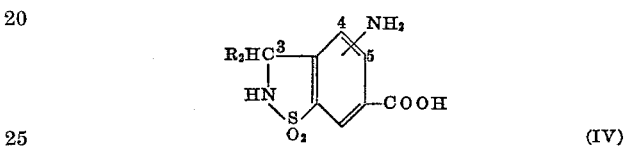

(IV)

in which $R_2$ has the meaning hereinbefore defined by the free amino group in the 4- or 5-position being alkylated with a compound of the general formula $R_1X$, in which $R_1$ has the meaning hereinbefore defined and X stands for halogen, preferably chlorine or bromine, or a hydroxy group, a hydroxysulphonyloxy group, a $R_1$-oxysulphonyloxy group, or an alkyl- or arylsulphonyloxy group, whereafter the compounds of the general Formula V as such, or in the form of its esters:

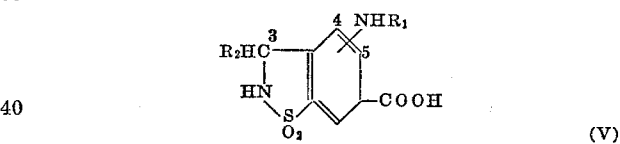

(V)

in which $R_1$ and $R_2$ have the meaning hereinbefore defined are converted into the corresponding compound of Formula I by a dehydrogenation.

The dehydrogenation of the compounds of Formula V above are performed in a manner known per se, e.g. by using potassium permanganate as the dehydrogenating agent.

The compounds of Formula IV are unknown compounds which can be provided from compounds of Formula II by processes known to the man skilled in the art. Thus for instance they can be obtained by a catalytical hydrogenation of compounds of Formula II or by these compounds being hydrogenated by sodium borohydride as hydrogenating agent.

In another embodiment of the invention the compounds of Formula I are obtained by reacting a compound of the general formula:

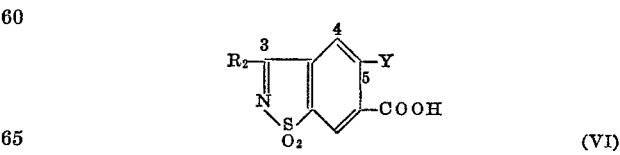

(VI)

in which $R_2$ has the meaning hereinbefore defined and Y stands for halogen with a compound of the formula $R_1NH_2$ in which $R_1$ has the meaning hereinbefore defined, whereby is formed a compound of Formula I with the $NHR_1$ group in the 5-position.

The compounds of Formula VI are also unknown compounds which are provided from 5-amino-2-halotoluene as the starting substance which by reaction with unsubstituted or substituted benzoylhalide under Friedel-Crafts conditions is converted into the corresponding 4-benzoyl-5 - benzoylamino - 2 - halotoluene which in turn is converted into the corresponding 5-amino - 4 - benzoyl-2-halotoluene. In a subsequent step the latter compound is diazotized and reacted with $SO_2$ in the presence of cupric chloride dihydrate to form the corresponding 4-benzoyl-5 - chlorosulphonyl - 2 - halotoluene which by reaction with ammonia is converted into the corresponding 5-halo - 6 - methyl - 3 - phenyl - 1,2 - benzisothiazole-1,1-dioxide the methyl group of which is finally converted into a carboxylic acid group by oxidation with potassium permanganate.

The compounds of Formula I are obtained in the form of their free acids, their salts or one of their esters, of which the esters, if desired, are saponified or vice versa.

For use in the therapy various pharmaceutically acceptable esters of the compounds of Formula I are interesting, as for instance esters with lower aliphatic alcohols, including diethylaminoethanol, and with other well-known and commonly used non-toxic alcohols.

The invention will now be illustrated by the following non-limiting examples from which the details of the embodiments will be apparent.

EXAMPLE 1

5-amino-6-carboxy-3-phenyl-1,2-benzisothiazole-1,1-dioxide (A) 4-acetamino - 2 - chloro-5-nitrobenzophenone.—A mixture of 4-acetamino - 2 - chloro - 5 - nitrobenzoic acid (26 g.) and thionyl chloride (100 ml.) is refluxed for about 1 hour, and the resulting solution evaporated in vacuo. The crude 4-acetamino - 2 - chloro - 5 - nitrobenzoyl chloride obtained is dissolved in dry benzene (300 ml.) and anhydrous aluminum chloride (26 g.) is added in portions, while stirring vigorously at 40–50° C. The mixture is stirred at room temperature for about 20 hours and then refluxed for about 1 hour. The resulting solution is poured into a mixture of ice (about 1 kg.) and concentrated hydrochloric acid (50 ml.). The resulting precipitate is filtered off and dissolved in chloroform (about 500 ml.), which is washed with water, dried ($MgSO_4$) and evaporated in vacuo. The residue is crystallized from ethanol and collected by filtration. After drying and recrystallization from a mixture of ethanol and methylcellosolve, 4 - acetamino - 2 - chloro - 5 - nitrobenzophenone is obtained with a melting point of 182–183° C. From the benzene layer of the mother liquors a further crop with the same melting point can be obtained.

(B) 4 - amino - 2 - chloro - 5 - nitrobenzophenone.—A mixture of 4-acetamino - 2 - chloro - 5 - nitrobenzophenone (22 g.), ethanol (300 ml.) and concentrated hydrochloric acid (200 ml.) is refluxed for about 2 hours. On cooling, the separated oil crystallizes. The material is collected by filtration and washed with cold aqueous ethanol. After drying and recrystallization from aqueous ethanol, 4-amono - 2 - chloro - 5 - nitrobenzophenone is obtained with a melting point of 149–150° C.

(C) 2-chloro - 4 - cyano - 5 - nitrobenzophenone.—A solution of 4 - amino - 2 - chloro - 5 - nitrobenzophenone (13.8 g.) in acetic acid (100 ml.) is slowly added to nitrosylsulfuric acid prepared from sodium nitrite (4.0 g.) and concentrated sulfuric acid (28 ml.), while stirring at room temperature. The resulting diazonium-solution is stirred at room temperature for a further 2 hours, and is then added dropwise to a solution of potassium cyanide (50 g.), cuprous cyanide (25 g.) and anhydrous sodium carbonate (250 g.) in water (700 ml.) in the presence of an upper benzene layer and while stirring vigorously at 65–70° C. After the addition is completed, the mixture is stirred until it has reached room temperature. The benzene layer is then separated and the aqueous layer extracted twice with benzene. The combined benzene fractions are washed with water, dried ($MgSO_4$) and evaporated in vacuo. The residue is crystallized with ethanol, filtered off and washed with ethanol and with petroleum ether. After drying and recrystallization from a mixture of ethanol and methylcellosolve, 2-chloro - 4 - cyano - 5 - nitrobenzophenone is obtained with a melting point of 133–135° C.

(D) 4-benzoyl-5-chloro-2-nitrobenzoic acid.—To the crude 4-cyano-2-chloro-5-nitrobenzophenone (about 75 g.) prepared from 4-amino-2-chloro-5-nitrobenzophenone (94 g.) as described in Example 1, Step C, concentrated sulfuric acid (650 ml.) and water (450 ml.) is added, and the mixture stirred at 180–185° C. for 2 hours. After cooling, water (about 1 l.) is added and the mixture is left in a refrigerator for about 20 hours. The separated material is collected by filtration and washed with water. It is then extracted with boiling sodium hydrogencarbonate solution (saturated, about 500 ml.) which is filtered hot in the presence of decolorizing carbon. The filtrate is cooled and then carefully acidified with concentrated hydrochloric acid (100 ml.). The resulting precipitate is filtered off and washed with water. After drying and recrystallization from aqueous ethanol, 4-benzoyl-5-chloro-2-nitrobenzoic acid is obtained with a melting point of 209–211° C.

(E) 4 - benzoyl-5-benzylthio-2-nitrobenzoic acid.—A mixture of 4-benzoyl-5-chloro-2-nitrobenzoic acid (35 g.), sodium hydrogencarbonate (30 g.), benzylmercaptane (30 ml.) and water (300 ml.) is heated on a steam bath for about 6 hours. The mixture is then cooled and carefully acidified with concentrated hydrochloric acid (50 ml.). The separated oil is extracted with diethyl ether (about 500 ml.) which is washed with water, dried ($MgSO_4$) and evaporated in vacuo. The residue is crystallized by trituration with petroleum ether, collected by filtration and washed with petroleum ether. After drying and recrystallization from aqueous ethanol, 4-benzoyl-5-benzylthio - 2 - nitrobenzoic acid is obtained with a melting point of 156–157° C.

(F) 6 - carboxy-5-nitro-3-phenyl-1,2-benzoisothiazole-1,1-dioxide.—A mixture of 4-benzoyl-5-benzylthio - 2 - nitrobenzoic acid (43 g.) and acetic acid (250 ml.) containing water (8 ml.) is cooled to about 5° C. An excess of chlorine is then bubbled through the stirred mixture, keeping the temperature below 15° C. After about 3.5 hours, excess chlorine is blown out of the reaction mixture with a stream of nitrogen, followed by dilution with cold water (250 ml.). The precipitated 4-benzoyl-5-chlorosulfonyl-2-nitrobenzoic acid is collected by filtration and washed with cold water. The damp filter cake is added in portions to concentrated ammonium hydroxide (400 ml.), while stirring at 10–12° C. After additional stirring at room temperature for about 20 hours, the reaction mixture is carefully acidified with concentrated hydrochloric acid (about 75 ml.). The resulting precipitate is collected by filtration and washed with water. After drying, the material is suspended in ethanol (100 ml.) and stirred at room temperature for 1 hour. After filtration, drying and recrystallization from ethanol, 6-carboxy-5-nitro-3-phenyl-1,2-benzisothiazole - 1,1 - dioxide is obtained with a melting point of 277–280° C. (dec.).

(G) 5 - amino-6-carboxy-3-phenyl-1,2-benzisothiazole-1,1-dioxide.—A solution of 6-carboxy-5-nitro-3-phenyl-1,2-benzisothiazole-1,1-dioxide (3.3 g.) in concentrated ammonium hydroxide (70 ml.) is added in portions to a warm solution of ferrosulfate heptahydrate (20 g.) in water (60 ml.). The reaction mixture is heated on a steam bath for a further 20 minutes and is then filtered hot. The filtrate is concentrated in vacuo to about 50 ml. and is then carefully acidified to pH=2.0 with hydrochloric acid. The resulting precipitate is collected by filtration and washed with water. After drying and recrystallization from a mixture of ethanol and methylcellosolve, 5 - amino-6-carboxy-3-phenyl-1,2-benzisothiazole-1,1-dioxide is obtained with a melting point higher than 285° C.

EXAMPLE 2

4-amino-6-carboxy-3-phenyl-1,2-benzisothiazole-1,1-dioxide (A) Ethyl-4-benzoyl-3,5-dinitrobenzoate.—A mixture of 4-carbethoxy-2,6-dinitrobenzoic acid (85 g.), thionylchloride (85 ml.) and pyridine (0.25 ml.) is refluxed for about 3 hours. The resulting solution is evaporated in vacuo and the remaining 4-carbethoxy - 2,6 - dinitrobenzoyl chloride is dissolved in dry benzene (130 ml.). Anhydrous aluminum chloride (50 g.) is then added in portions to the refluxing solution while stirring vigorously. After the addition is completed, the mixture is stirred and refluxed for a further 2 hours. After cooling to about 50° C., methylene chloride (250 ml.) is added followed by a mixture of ice (250 g.) and concentrated hydrochloric acid (150 ml.). After additional stirring for about 1 hour, the organic layer is separated, washed with water and evaporated in vacuo. The residue is triturated with hot ethanol (200 ml.) and, after cooling, the resulting precipitate is collected by filtration, and washed with cold ethanol followed by petroleum ether. After drying and recrystallization from methylcellosolve, ethyl 4-benzoyl-3,5-dinitrobenzoate is obtained with a melting point of 172–173° C.

(B) 4-benzoyl - 3,5 - dinitrobenzoic acid.—To a stirred suspension of ethyl 4-benzoyl - 3,5 - dinitrobenzoate (160 g.) in ethanol (800 ml.), 2 N sodium hydroxide (260 ml.) is added dropwise within 15 minutes. After additional stirring for 10 minutes, the resulting solution is clarified by filtration and is then acidified by the addition of 4 N hydrochloric acid (150 ml.). After cooling, the resulting precipitate is collected by filtration and washed with water. After drying and recrystallization from aqueous ethanol, 4-benzoyl-3,5-dinitrobenzoic acid is obtained with a melting point of 248–251° C. (dec.).

(C) 5-amino-4-benzoyl-3 - nitrobenzoic acid.—A mixture of 4-benzoyl-3,5-dinitrobenzoic acid (110 g.) and pyridine (220 ml.) is heated on a steam bath for about 15 minutes to afford the formation of the pyridinium-salt. Water (440 ml.) is then added and the mixture is cooled to 20–22° C. To the stirred mixture, sodium dithionite (124 g.) is then added in portions during 7–8 minutes keeping the temperature at 20–22° C. After the addition is completed the stirring is continued for a further 6–7 minutes allowing the temperature to drop to 12–15° C. The resulting red solution is carefully acidified with concentrated hydrochloric acid (380 ml.) keeping the temperature below 22° C. The reaction mixture is left at room temperature for about 20 hours. The precipitated material is then collected by filtration and washed with water. After recrystallization from acetonitrile, 5-amino-4-benzoyl-3-nitrobenzoic acid is obtained with a melting point of 203–204° C. (dec.).

(D) 4-benzoyl-3-nitro - 5 - sulfamylbenzoic acid.—A mixture of 5-amino-4-benzoyl-3-nitrobenzoic acid (28.6 g.) and concentrated hydrochloric acid (100 ml.) is heated on a steam bath for about 10 minutes and then cooled. The amine is diazotized by dropwise addition of a solution of sodium nitrite (7.6 g.) in water (40 ml.) while stirring at 0–5° C. The resulting diazonium-mixture is poured into a solution of cupric chloride dihydrate (4.0 g.) in water (15.0 ml.) and acetic acid (140 mL.) saturated with $SO_2$, while stirring at room temperature. The stirring is continued for a further 1 hour and the mixture is then diluted with cold water (300 ml.). The precipitated 4-benzoyl-5-chlorosulfonyl-3 - nitro - benzoic acid is collected by filtration and washed with water. The damp filter-cake is then added in portions to concentrated ammonium hydroxide (300 ml.) while stirring at 10–12° C. After additional stirring at room temperature for about 20 hours, the solution is carefully acidified to pH=2.0 with concentrated hydrochloric acid. The resulting precipitate is collected by filtration and washed with water. After drying and recrystallization from aqueous ethanol, 4-benzoyl-3-nitro-5-sulfamylbenzoic acid is obtained with a melting point of 234–235° C.

(E) 4-amino-6-carboxy-3-phenyl-1,2 - benzisothiazole-1,1-dioxide.—To a stirred solution of 4-benzoyl-3-nitro-5-sulfamylbenzoic acid (7.0 g.) in a mixture of pyridine (15 ml.) and water (50 ml.), sodium dithionite (14 g.) is added in portions. The mixture is heated on a steam bath for about 1 hour and is then evaporated in vacuo. The remaining material is dissolved in hot water (about 50 ml.) and the solution is acidified with concentrated hydrochloric acid (15 ml.). The mixture is heated on a steam bath for 15 minutes and left at room temperature for about 20 hours. The resulting precipitate is collected by filtration and washed with water. After drying and recrystallization from a mixture of acetonitrile and methylcellosolve, 4-amino-6-carboxy-3-phenyl - 1,2 - benzisothiazole-1,1-dioxide is obtained with a melting point of 287–288° C. (dec.).

EXAMPLE 3

4-amino-6-carboxy-3-(4'-methylphenyl)-1,2-benzisothiazole-1,1-dioxide (A) Ethyl 3,5-dinitro-4 - (4' - methylbenzoyl) - benzoate.—To a solution of 2,6-dinitro-4-carbethoxybenzoyl chloride (prepared from 2,6-dinitro-4-carbethoxybenzoic acid (110 g.) according to the procedure described in Example 2, Step A) in a mixture of dry toluene (550 ml.) and carbondisulfide (550 ml.), anhydrous aluminum chloride (160 g.) is added in portions while stirring vigorously at room temperature. After the addition is completed, the stirring is continued for a further 2 hours followed by refluxing for 2 hours. The mixture is then poured into a mixture of ice (about 2 kg.) and concentrated hydrochloric acid (500 ml.). After dilution with methylene chloride (500 ml.), the organic layer is separated, washed with water and evaporated in vacuo. The residue is triturated with hot ethanol (300 ml.) and, after cooling, the resulting precipitate is collected by filtration and washed with cold ethanol followed by petroleum ether. After drying and recrystallization from a mixture of ethanol and methylcellosolve, ethyl 3,5-dinitro-4-(4'-methylbenzoyl)-benzoate is obtained with a melting point of 177.5–179° C.

(B) 3,5 - dinitro - 4 - (4'-methylbenzoyl)-benzoic acid.—By replacing in Example 2, Step B, ethyl 4-benzoyl-3,5-dinitrobenzoate by ethyl 3,5-dinitro-4-(4'-methylbenzoyl)-benzoate, 3,5-dinitro-4-(4'-methylbenzoyl)-benzoic acid is obtained with a melting point of 266–268° C.

(C) 5-amino - 4 - (4' - methylbenzoyl)-3-nitrobenzoic acid.—By replacing in Example 2, Step C, 4-benzoyl-3,5-dinitrobenzoic acid by 3,5-dinitro-4-(4'-methylbenzoyl)-benzoic acid, 5-amino-4-(4'-methylbenzoyl) - 3 - nitrobenzoic acid is obtained with a melting point of 223.5–225° C.

(D) 4-(4' - methylbenzoyl) - 3 - nitro-5-sulfamylbenzoic acid.—By replacing in Example 2, Step D, 5-amino-4-benzoyl-3-nitrobenzoic acid by 5 - amino-4-(4'-methylbenzoyl)-3-nitrobenzoic acid, 4-(4' - methylbenzoyl)-3-nitro-5-sulfamylbenzoic acid is obtained with a melting point of 231–232° C.

(E) 4-amino - 6 - carboxy - 3 - (4'-methylphenyl)-1,2-benzisothiazole-1,1-dioxide.—By replacing in Example 1, Step G, 6-carboxy - 5 - nitro-3-phenyl-1,2-benzisothiazole-1,1-dioxide by 4-(4' - methylbenzoyl)-3-nitro-5-sulfamylbenzoic acid, 4-amino-6-carboxy-3-(4'-methylphenyl)-1,2-benzisothiazole-1,1-dioxide is obtained with a melting point of 321.5–324.5° C. (dec.).

EXAMPLE 4

4-amino-6-carboxy-3-(2',4'-dimethylphenyl)-1,2-benzisothiazole-1,1-dioxide (A) Ethyl 4-(2',4' - dimethylbenzoyl) - 3,5-dinitro benzoate.—By replacing in Example 2, Step A, the benzene by meta-xylene and performing the reaction at 100°

C., ethyl 4-(2',4'-dimethylbenzoyl)-3,5-dinitrobenzoate is obtained with a melting point of 155.5–157.5° C.

(B) 4-(2',4' - dimethylbenzoyl) - 3,5-dinitrobenzoic acid.—By replacing in Example 2, Step B, the ethyl 4-benzoyl - 3,5 - dinitrobenzoate by ethyl 4-(2',4'-dimethylbenzoyl) - 3,5 - dinitrobenzoate, 4-(2',4'-dimethylbenzoyl)-3,5-dinitrobenzoic acid is obtained with a melting point of 243–245° C.

(C) 5-amino - 4 - (2',4' - dimethylbenzoyl)-3-nitrobenzoic acid.—By replacing in Example 2, Step C, 4-benzoyl-4,5-dinitrobenzoic acid by 4-(2',4'-dimethylbenzoyl)-3,5-dinitrobenzoic acid, 5-amino-4(2',4' - dimethylbenzoyl)-3-nitrobenzoic acid is obtained with a melting point of 245–247° C.

(D) 4-(2',4' - dimethylbenzoyl - 3 - nitro-5-sulfamylbenzoic acid.—By replacing in Example 2, Step D, 5-amino - 4 - benzoyl-3-nitrobenzoic acid by 5-amino-4-(2',4' - dimethylbenzoyl) - 3 - nitrobenzoic acid, -(2',4'-dimethylbenzoyl) - 3 - nitro-5-sulfamylbenzoic acid crystallizing with 1 mole of acetonitrile is obtained with a melting point of 236–238° C.

(E) 4-amino - 6 - carboxy - 3 - (2',4'-dimethylphenyl)-1,2-benzisothiazole - 1,1 - dioxide.—By replacing in Example 2, Step E, 4-benzoyl-3-nitro-5-sulfamylbenzoic acid by 4-(2',4' - dimethylbenzoyl)-3-nitro-5-sulfamylbenzoic acid, 4-amino - 6 - carboxy-3-(2',4'-dimethylphenyl)-1,2-benzisothiazole - 1,1 - dioxide is obtained with a melting point of 269.5–272° C.

EXAMPLE 5

4-amino-6-carboxy-3-(4'-chlorophenyl)-1,2-benzisothiazole-1,1-dioxide (A) Ethyl 4 - (4' - chlorobenzoyl) - 3,5 - dinitrobenzoate.—By replacing in Example 2, Step A, benzene by chlorobenzene and performing the reaction at 80° C., ethyl 4-(4' - chlorobenzoyl) - 3,5 - dinitrobenzoate is obtained with a melting point of 162.5–164° C.

(B) 4-(4'-chlorobenzoyl) - 3,5 - dinitrobenzoic acid.—By replacing in Example 2, Step B, ethyl 4-benzoyl-3,5-dinitrobenzoate by ethyl 4-(4' - chlorobenzoyl)-3,5-dinitrobenzoate, 4 - (4' - chlorobenzoyl)-3,5-dinitrobenzoic acid is obtained with a melting point of 266–267° C.

(C) 5-amino - 4 - (4' - chlorobenzoyl)-3-nitrobenzoic acid.—By replacing in Example 2, Step C, 4-benzoyl-3,5-dinitrobenzoic acid by 4-(4' - chlorobenzoyl)-3,5-dinitrobenzoic acid, 5-amino-4-(4' - chlorobenzoyl)-3-nitrobenzoic acid crystallizing with 1 mole of acetonitrile is obtained with a melting point of 239–241° C.

(D) 4-(4'-chlorobenzoyl) - 3 - nitro-5-sulfamylbenzoic acid.—By replacing in Example 2, Step D, 5-amino-4-benzoyl-3-nitrobenzoic acid by 5-amino-4-(4'-chlorobenzoyl)-3-nitrobenzoic acid, 4-(4' - chlorobenzoyl)-3-nitro-5-sulfamylbenzoic acid is obtained with a melting point of 234.5–235.5° C.

(E) 4 - amino - 6 - carboxy - 3 - (4' - chlorophenyl)-1,2-benzisothiazole-1,1-dioxide.—By replacing in Example 2, Step E, 4-benzoyl-3-nitro-5-sulfamylbenzoic acid by 4-(4'-chlorobenzoyl)-3-nitro-5-sulfamylbenzoic acid, 4-amino - 6 - carboxy - 3 - (4' - chlorophenyl) - 1,1 - benzisothiazole-1,1-dioxide is obtained with a melting point higher than 300° C.

EXAMPLE 6

6-carboxy-5-chloro-3-phenyl-1,2-benzisothiazole-1,1-dioxide (A) 5 - amino - 4 - benzoyl - 2 - chlorotoluene.—5-amino - 2 - chlorotoluene (71 g.) is during 1 hour added in portions to benzoylchloride (150 ml.) while stirring at 100–120° C. The temperature is then raised to 180–190° C., whereafter anhydrous zinc-chloride (90 g.) is added in portions during about 1 hour. After the addition is completed, the temperature is raised to 200–210° C. and the mixture is stirred at this temperature for a further 2 hours. The reaction mixture is then, while hot, poured into a mixture of ice (about 1 kg.) and concentrated hydrochloric acid (100 ml.). The resulting precipitate is collected by filtration and washed twice with hot 2 N hydrochloric acid (each time 1 liter) and with water. The obtained crude 4-benzoyl-5-benzoylamino-2-chlorotoluene is added to a mixture of concentrated sulphuric acid (200 ml.) and water (90 ml.) and the mixture is stirred at 165° C. for 45 minutes. The reaction mixture is then poured into ice (about 1 kg.) and the resulting precipitate is collected by filtration and washed with water. The material is dissolved in diethyl ether (about 1 liter) and the solution is washed twice with 2 N sodium hydroxide (each time 1 liter) and with water. The organic layer is dried (MgSO$_4$) and then evaporated in vacuo. The residue is triturated with ethanol (75 ml.) and the resulting crystalline material is collected by filtration and washed with ethanol. After drying and recrystallization from ethanol, 5-amino-4-benzoyl-2-chlorotoluene is obtained with a melting point of 122–123.5° C.

(B) 5 - chloro - 6 - methyl - 3 - phenyl - 1,2 - benzisothiazole-1,1-dioxide.—By replacing in Example 2, Step D, 5-amino-4-benzoyl-3-nitrobenzoic acid by 5-amino-4-benzoyl - 2 - chlorotoluene, 5-chloro-6-methyl-3-phenyl-1,2-benzisothiazole-1,1-dioxide is obtained with a melting point of 216–218° C.

(C) 6 - carboxy - 5 - chloro - 3 - phenyl - 1,2 - benzisothiazole-1,1-dioxide.—To a stirred suspension of 5-chloro-6 - methyl - 3 - phenyl - 1,2 - benzisothiazole - 1,1 - dioxide (50 g.) in refluxing 2 N sodium hydroxide (500 ml.) a solution of potassium permanganate (75 g.) in water (750 ml.) is added within 1 hour. The mixture is stirred and refluxed for a further 30 minutes and is then filtered while hot. The filtrate is acidified with concentrated hydrochloric acid (125 ml.) and, after cooling, the resulting precipitate is collected by filtration and washed with water. After drying and recrystallization from aqueous ethanol, 6 - carboxy - 5 - chloro - 3 - phenyl - 1,2 - benzisothiazole 1,1-dioxide is obtained with a melting point of 224–226° C.

EXAMPLE 7

6-carboxy-5-chloro-3-(3'-chlorophenyl)-1,2-benzisothiazole-1,1-dioxide (A) 5 - amino - 2 - chloro - 4 - (3' - chlorobenzoyl)-toluene.—By replacing in Example 6, Step A, benzoylchloride by 3-chlorobenzoylchloride, 5- amino-2-chloro-4-(3'-chlorobenzoyl)-toluene is obtained with a melting point of 146–147° C.

(B) 5 - chloro - 3 - (3' - chlorophenyl) - 6 - methyl-benzisothiazole-1,1-dioxide.—By replacing in Example 2, Step D, 5-amino-4-benzoyl-3-nitrobenzoic acid by 5-amino - 2 - chloro -4 - (3' - chlorobenzoyl) - toluene. 5 - chloro - 3 - (3' - chlorophenyl) - 6 - methyl - 1,2 - benzisothiazole-1,1-dioxide is obtained with a melting point of 172–174° C. (dec.).

(C) 6 - carboxy - 5 - chloro - 3 - (3' - chlorophenyl)-1,2-benzisothiazole-1,1-dioxide.—By replacing in Example 6, Step C, 5-chloro-6-methyl-3-phenyl-1,2-benzisothiazole-1,1-dioxide by 5-chloro-3-(3'-chlorophenyl)-6-methyl-1,2-benzisothiazole-1,1-dioxide, 6-carboxy-5-chloro-3-(3'-chlorophenyl)-1,2-benzisothiazole-1,1-dioxide is obtained as a hydrate with a melting point of 215–217° C.

EXAMPLE 8

4-amino-6-carboxy-3-phenyl-1,2-benzisothiazoline-1,1-dioxide

To a stirred solution of 4-amino-6-carboxy-3-phenyl-1,2-benzisothiazole-1,1-dioxide (2.0 g.) in 2 N sodium hydroxide (20 ml.), sodium borohydride (0.5 g.) is added in portions during 5 minutes. The solution is stirred at room temperature for a further 4 hours and is then acidified with 4 N acetic acid (20 ml.). The resulting precipitate is collected by filtration and washed with water. After drying and recrystallization from ethanol, 4-amino- 6-carboxy-3-phenyl-1,2-benzisothiazoline-1,1-dioxide is obtained with a melting point of 290–292.5° C. (dec.).

EXAMPLE 9

5-amino-6-carboxy-3-phenyl-1,2-benzisothiazoline-1,1-dioxide

By replacing in Example 8 4-amino-6-carboxy-3-phenyl-1,2-benzisothiazole-1,1-dioxide by 5-amino-6-carboxy-3-phenyl - 1,2 - benzisothiazole-1,1-dioxide, 5-amino-6-carboxy - 3 - phenyl-1,2-benzisothiazoline-1,1-dioxide is obtained with a melting point of 281–284° C. (dec.).

EXAMPLE 10

5-benzylamino-6-carboxy-3-phenyl-1,2-benzisothiazole-1,1-dioxide (A) 5-benzylamino-6-carboxy-3-phenyl-1,2 - benzisothiazoline-1,1-dioxide.—A solution of 5-amino-6-carboxy-3-phenyl-1,2-benzisothiazoline-1,1-dioxide (1.0 g.) and benzylbromide (1.0 ml.) in methylcellosolve is heated on a steam bath for 24 hours. After cooling, the solution is diluted with water (10 ml.) and the resulting precipitate is collected by filtration and washed with water. After drying and recrystallization from ethanol, 5-benzylamino-6 - carboxy-3-phenyl-1,2-benzisothiazoline-1,1-dioxide is obtained as a hydrate with a melting point of 270–272° C. (dec.).

(B) 5-benzylamino-6-carboxy-3-phenyl-1,2-benzisothiazole-1,1-dioxide.—To a stirred solution of 5-benzylamino-6-carboxy-3-phenyl-1,2-benzisothiazoline-1,1-dioxide hydrate (2.5 g.) in 2 N sodium hydroxide (25 ml.), a solution of potassium permanganate (0.7 g.) in water (25 ml.) is added dropwise within 5 minutes. After the addition is completed, the mixture is stirred for a further 10 minutes and is then filtered. The filtrate is acidified with concentrated hydrochloric acid (about 7 ml.) and the resulting precipitate is collected by filtration and washed with water. After drying and recrystallization twice from ethanol, 5 - benzylamino-6-carboxy-3-phenyl-1,2-benzisothiazole-1,1-dioxide is obtained with a melting point of 263–265° C. (dec.).

EXAMPLE 11

4-benzylamino-6-carboxy-3-phenyl-1,2-benzisothiazole-1,1-dioxide (A) 4-benzylamino-6-carbethoxy-3-phenyl-1,2-benzisothiazoline-1,1-dioxide.—A solution of 4-amino-6-carboxy-3-phenyl-1,2-benzisothiazoline-1,1-dioxide (1.0 g.) and benzylbromide (1.0 ml.) in ethanol (10 ml.) is refluxed for 96 hours. After 24, 48 and 72 hours additional amounts of benzylbromide (each time 1.0 ml.) are added. After cooling, the resulting precipitate is collected by filtration and washed with cold ethanol followed by petroleum ether. After drying the recrystallization from ethanol, 4 - benzylamino-6-carbethoxy-3-phenyl-1,2-benzisothiazoline-1,1-dioxide is obtained with a melting point of 171.5–173.5° C.

(B) 4-benzylamino-6-carboxy-3-phenyl - 1,2 - benzisothiazoline-1,1-dioxide.—A mixture of 4-benzylamino-6-carbethoxy - 3 - phenyl-1,2-benzisothiazoline-1,1-dioxide (0.75 g.) and 2 N sodium hydroxide (7.5 ml.) is heated on a steam bath for 15 minutes. The resulting solution is acidified with 4 N hydrochloric acid (4.0 ml.) and, after cooling, the precipitate is collected by filtration and washed with water. After drying and recrystallization, 4-benzylamino-6-carboxy-3-phenyl-1,2-benzisothiazoline-1,1-dioxide crystallizing with 1 mole of ethanol is obtained with a melting point of 222–223.5° C. (dec.).

(C) 4-benzylamino-6-carboxy-3-phenyl-1,2-benzisothiazole-1,1-dioxide.—By replacing in Example 10, Part B, 5 - benzylamino-6-carboxy-3-phenyl-1,2-benzisothiazoline-1,1-dioxide by 4 - benzylamino - 6 - carboxy-3-phenyl-1,2-benzisothiazoline-1,1-dioxide, 4-benzylamino-6-carboxy-3-phenyl-1,2-benzisothiazole-1,1-dioxide crystallizing with 1 mole of ethanol is obtained with a melting point of 235–236° C. (dec.).

EXAMPLE 12

4-benzylamino-6-carbethoxy-3-phenyl-1,2-benzisothiazole-1,1-dioxide

A solution of 4-amino-6-carboxy-3-phenyl-1,2-benzisothiazole-1,1-dioxide (1.5 g.) and benzylbromide (1.0 ml.) in ethanol (15 ml.) is refluxed for 5 days. After about 24, 48, 72 and 96 hours additional amounts of benzylbromide (each time 1.0 ml.) are added. The resulting solution is evaporated in vacuo and the residue is crystallized by trituration with ethylacetate (25 ml.). The material is collected by filtration and dried to yield 4-benzylamino-6-carbethoxy-3-phenyl-1,2-benzisothiazole-1,1-dioxide with a melting point of 159–160° C.

EXAMPLE 13

4-benzylamino-6-carboxy-3-phenyl-1,2-benzisothiazole-1,1-dioxide

By replacing in Example 11, Part B, 4-benzylamino-6 - carbethoxy - 3 - phenyl-1,2-benzisothiazoline-1,1-dioxide by 4-benzylamino-6-carbethoxy-3-phenyl-1,2-benzisothiazole-1,1-dioxide, 4 - benzylamino - 6 - carboxy-3-phenyl-1,2-benzisothiazole-1,1-dioxide crystallizing with 1 mole of ethanol is obtained with a melting point of 235–236° C. (dec.). The material (IR, analysis) is identical with the material prepared as in Example 11 Part C.

EXAMPLES 14–16

By replacing in Example 12 4-amino-6-carboxy-3-phenyl-1,2-benzisothiazole-1,1-dioxide by 4-amino-6-carboxy-3-(4'-methylphenyl) - 1,2 - benzisothiazole-1,1-dioxide, 4 - amino-6-carboxy-3-(2',4'-dimethylphenyl)-1,2-benzisothiazole-1,1-dioxide and 4-amino-6-carboxy-3-(4'-chlorophenyl)-1,2-benzisothiazole - 1,1 - dioxide respectively, the corresponding 4-benzylamino-6-carbethoxy-3-(4'-methylphenyl)-1,2-benzisothiazole-1,1-dioxide, 4-benzylamino-6-carbethoxy - 3 - (2',4'-dimethylphenyl)-1,2-benzisothiazole-1,1-dioxide and 4 - benzylamino-6-carbethoxy-3-(4'-chlorophenyl) - 1,2 - benzisothiazole-1,1-dioxide are obtained with melting points of 153.5–155.5° C., 149–150° C. and 162–163° C. respectively.

EXAMPLES 17–19

By replacing in Example 11, Part B, 4-benzylamino-6-carbethoxy-3-phenyl - 1,2 - benzisothiazoline-1,1-dioxide by the ethyl esters of Examples 14–16, the corresponding 4 - benzylamino-6-carboxy-3-(4'-methylphenyl)-1,2-benzisothiazole-1,1-dioxide, 4-benzylamino - 6 - carboxy-3-(2',4'-dimethylphenyl) - 1,2 - benzisothiazole-1,1-dioxide crystallizing with 1 mole of ethanol and 4-benzylamino-6-carboxy - 3 - (4'-chlorophenyl)-1,2-benzisothiazole-1,1-dioxide crystallizing with 1 mole of ethanol are obtained with melting points of 247–248.5° C., 206–208° C. and 237–239° C. respectively.

EXAMPLE 20

4-allylamino-6-carbethoxy-3-phenyl-1,2-benzisothiazole-1,1-dioxide

By replacing in Example 12 benzylbromide by allylbromide and extending the reaction time to 14 days, 4-allylamino-6-carbethoxy - 3 - phenyl - 1,2 - benzisothiazole-1,1-dioxide is obtained with a melting point of 123.5–124.5° C.

EXAMPLE 21

4-allylamino-6-carboxy-3-phenyl-1,2-benzisothiazole-1,1-dioxide

By replacing in Example 11, Part B, 4-benzylamino-6-carbethoxy - 3 - phenyl-1,2-benzisothiazoline-1,1-dioxide by 4-allylamino-6-carbethoxy - 3 - phenyl-1,2-benzisothiazoline-1,1-dioxide, 4-allylamino - 6 - carboxy-3-phenyl-1,2-benzisothiazole-1,1-dioxide is obtained with a melting point of 200.5–202° C.

EXAMPLE 22

4-n-butylamino-6-carboxy-3-phenyl-1,2-benzisothiazole-1,1-dioxide (A) 4-n-butylamino-6-carboxy-3-phenyl - 1,2-benzisothiazoline-1,1-dioxide.—To a suspension of 4-amino-6-carboxy-3-phenyl-1,2 - benzisothiazoline-1,1-dioxide (6.0 g.) in n-butanol (200 ml.), concentrated sulphuric acid (1.3 ml.) is added and the mixture is stirred and refluxed for 7–8 days under such conditions that the water formed during the reaction is separated. 2 N sodium hydroxide (70 ml.) is then added and the mixture is stirred and refluxed for 30 minutes. After this saponification, the aqueous layer is separated and acidified with 4 N hydrochloric acid (40 ml.). The resulting precipitate is collected by filtration and washed with water. After drying and recrystallization from ethanol, 4-n-butylamino-6-carboxy-3-phenyl-1,2-benzisothiazoline - 1,1 - dioxide is obtained with a melting point of 238–240° C.

(B) 4-n-butylamino - 6 - carboxy-3-phenyl-1,2-benzisothiazole-1,1-dioxide.—By replacing in Example 10, Part B, 5-benzylamino - 6 - carboxy-3-phenyl-1,2-benzisothiazoline-1,1-dioxide by an equimolar amount of 4-n-butylamino-6-carboxy - 3 - phenyl-1,2-benzisothiazoline-1,1-dioxide, 4-n-butylamino - 6 - carboxy-3-phenyl-1,2-benzisothiazole-1,1-dioxide is obtained as a semihydrate with a melting point of 190–191.5° C.

EXAMPLE 23

4-n-pentylamino-6-carboxy-3-phenyl-1,2-benzisothiazole-1,1-dioxide (A) 4 - n-pentylamino-6-carboxy-3-phenyl-1,2-benzisothiazoline-1,1-dioxide.—By replacing in Example 22, Step A, n-butanol by n-pentanol, 4-n-pentylamino-6-carboxy-3-phenyl-1,2-benzisothiazoline-1,1-dioxide is obtained with a melting point of 227–230° C.

(B) 4 - n-pentylamino-6-carboxy-3-phenyl-1,2-benzisothiazole - 1,1 - dioxide.—By replacing in Example 10 Part B 5-benzylamino-6-carboxy-3-phenyl - 1,2 - benzisothiazoline-1,1-dioxide by an equimolar amount of 4-n-pentylamino-6-carboxy-3-phenyl - 1,2 - benzisothiazoline-1,1-dioxide, 4-n-pentylamino-6-carboxy-3-phenyl-1,2-benzisothiazole-1,1-dioxide is obtained with a melting point of 167.5–170° C.

EXAMPLE 24

6-carboxy-3-phenyl-4-(2-pyridyl-(4)-ethylamino)-1,2-benzisothiazole-1,1-dioxide

A mixture of 4-amino-6-carboxy-3-phenyl-1,2-benzisothiazole-1,1-dioxide (1.0 g.), 4-vinylpyridine (0.5 g.), acetic acid (0.3 g.) and methanol (5.0 ml.) is refluxed for 4 hours. After cooling, the resulting oily precipitate is isolated and crystallized by trituration with ethanol (10 ml.). The material is collected by filtration and washed with cold ethanol. After drying and recrystallization from ethanol, 6-carboxy-3-phenyl-4-(2-pyridyl-(4)-ethylamino)-1,2-benzisothiazole - 1,1 - dioxide is obtained with a melting point of 230–233° C. (dec.).

EXAMPLE 25

6-carboxy-4-(furyl-(2)-methylamino)-3-phenyl-1,2-benzisothiazole-1,1-dioxide (A) 6-carboxy - 4 - (furyl-(2)-methylamino)-3-phenyl-1,2-benzisothiazoline-1,1-dioxide.—To a solution of sodium (0.13 g.) in methylcellosolve (15 ml.), 4-amino-6-carboxy-3-phenyl-1,2-benzisothiazoline-1,1-dioxide (1.75 g.) is added followed by furfural (0.88 g.). The resulting solution is heated on a steam bath for 24 hours and is then left at room temperature for 18 hours. The solution is then cooled to 5° C. and at this temperature sodium borohydride (0.9 g.) is added in portions during about 1 hour while stirring. After additional stirring for 3 hours allowing the solution to reach room temperature, the solvent is removed in vacuo. The residue is redissolved in water (20 ml.) and, after cooling, the solution is acidified with acetic acid (5 ml.). The resulting precipitate is collected by filtration and washed with water. After recrystallization from aqueous ethanol, 6-carboxy-4-(furyl-(2)-methylamino)-3-phenyl - 1,2 - benzisothiazoline-1,1-dioxide is obtained as a hydrate with a melting point of 205.5–206.5° C. (dec.).

(B) 6-carboxy - 4 - (furyl-(2)-methylamino)-3-phenyl-1,2-benzisothiazole-1,1-dioxide.—By replacing in Example 10, Sept B, 5-benzylamino-6-carboxy-3-phenyl-1,2-benzisothiazoline - 1,1 - dioxide by an equimolar amount of 6-carboxy-4-(furyl - (2) - methylamino) - 3 - phenyl-1,2-benzisothiazoline - 1,1 - dioxide, 6-carboxy-4-(furyl-(2)-methylamino)-3-phenyl-1,2-benzisothiazole-1,1-dioxide is obtained with a melting point of 181–185° C. (dec.).

EXAMPLE 26

5-benzylamino-6-carboxy-3-phenyl-1,2-benzisothiazole-1,1-dioxide

A mixture of 6-carboxy-5-chloro-3-phenyl-1,2-benzisothiazole-1,1-dioxide (2.0 g.) and benzylamine (10 ml.) is stirred at 125–130° C. for 18 hours. The mixture is then poured into ice-cold 4 N acetic acid (100 ml.) and the resulting precipitate is collected by filtration and washed with water. After drying and recrystallization from ethanol, 5-benzylamino - 6 - carboxy-3-phenyl-1,2-benzisothiazole-1,1-dioxide is obtained with a melting point of 263–265° C. (dec.). The material (IR, analysis) is identical with the material prepared as in Example 10, Part B.

EXAMPLES 27–36

By following the procedure described in Example 26 but replacing the benzylamine by the amines of the following Table I, the corresponding 5-N-substituted-6-carboxy-3-phenyl - 1,2 - benzisothiazole-1,1-dioxides are obtained:

TABLE I

| Ex. No. | Amines | N-substituent | M.P., °C.[1] With decomposition |
|---|---|---|---|
| 27 | n-Butylamine | n-Butyl | 254–257 |
| 28 | n-Pentylamine | n-Pentyl | 249–251 |
| 29 | iso-Amylamine | Isoamyl | 232–235 |
| 30 | 3'-methoxypropylamine | 3'-methoxypropyl | 211–212 |
| 31 | 4'-chlorobenzylamine | 4'-chlorobenzyl | 271–273 |
| 32 | 4'-methoxybenzylamine | 4'-methoxybenzyl | 240–241 |
| 33 | 3'-methylbenzylamine | 3'-methylbenzyl | 213–214 |
| 34 | β-phenylethylamine | β-phenylethyl | 241–244 |
| 35 | Pyridyl-(3)-methyl-amine | Pyridyl-(3)-methyl | 285–286 |
| 36 | Furyl-(2)-methylamine | Furyl-(2)-methyl | 248–252 |

[1] With decomposition.

The compounds prepared as in Examples 31, 32 and 33 are obtained crystallizing with 1 mole of ethanol. The material prepared as in Example 35 is obtained crystallizing with 0.25 mole of water.

EXAMPLE 37

5-benzylamino-6-carboxy-3-(3'-chlorophenyl)-1,2-benzisothiazole-1,1-dioxide

By replacing in Example 26 6-carboxy-5-chloro-3-phenyl-1,2-benzisothiazole-1,1-dioxide by 6-carboxy-5-chloro-3-(3'-chlorophenyl)-1,2-benzisothiazole - 1,1 - dioxide, 5-benzylamino-6-carboxy-3-(3'-chlorophenyl)-1,2 - benzisothiazole-1,1-dioxide is obtained as a semihydrate with a melting point of 216–218° C. (dec.).

EXAMPLE 38

Cyanomethyl ester of 5-benzylamino-6-carboxy-3-phenyl-1,2-benzisothiazole-1,1-dioxide A mixture of 5-benzylamino-6-carboxy-3-phenyl-1,2-benzisothiazole-1,1-dioxide (0.78 g.), chloroacetonitrile (0.25 g.), triethylamine (0.22 g.) and dry acetone (7.0 ml.) is refluxed for 24 hours. After cooling, the separated triethylamine-hydrochloride is removed by filtration and the filtrate is evaporated in vacuo. The residue is triturated with saturated sodium hydrogencarbonate solution (20 ml.) and the resulting crystalline material is collected by filtration and washed with water. After drying and recrystallization from ethanol, the cyanomethyl ester of 5-benzylamino-6-carboxy-3-phenyl-1,2-benzisothiazole - 1,1-dioxide is obtained with a melting point of 145–148° C. (dec.).

What we claim is:

1. A compound of the formula

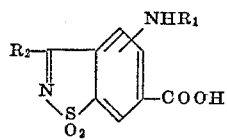

in which $R_1$ represents alkyl having from 3 to 8 carbon atoms, allyl, methoxypropyl, phenethyl, benzyl, optionally substituted by halo, lower alkyl, or lower alkoxy, pyridylethyl, pyridylmethyl, or furylmethyl; $R_2$ is phenyl optionally substituted by halo or $C_1$–$C_3$ alkyl; cyanomethyl, benzyl, or lower alkyl esters thereof; and pharmaceutically acceptable salts thereof.

2. A compound according to claim 1, and having the formula:

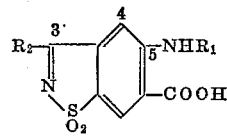

in which $R_1$ represents alkyl having from 3 to 8 carbon atoms, allyl, methoxypropyl, phenethyl, benzyl, optionally substituted by halo, lower alkyl, or lower alkoxy, pyridylethyl, pyridylmethyl, or furylmethyl; $R_2$ is phenyl optionally substituted by halo or $C_1$–$C_3$ alkyl; cyanomethyl, benzyl, or lower alkyl esters thereof; and pharmaceutically acceptable salts thereof.

3. A compound according to claim 1, and having the formula:

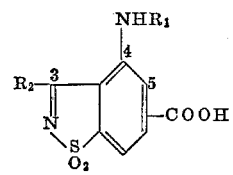

in which $R_1$ represents alkyl having from 3 to 8 carbon atoms, alkyl, methoxypropyl, phenethyl, benzyl optionally substituted by halo, lower alkyl, or lower alkoxy, pyridylethyl, pyridylmethyl, or furylmethyl; $R_2$ is phenyl optionally substituted by halo or $C_1$–$C_3$ alkyl; cyanomethyl, benzyl, or lower alkyl esters thereof; and pharmaceutically acceptable salts thereof.

4. A compound according to claim 1, in which $R_1$ represents alkyl having from 3 to 8 carbon atoms, allyl and methoxypropyl; and $R_2$ is phenyl optionally substituted by halo or $C_1$–$C_3$ alkyl; cyanomethyl, benzyl, or lower alkyl esters thereof; and pharmaceutically acceptable salts thereof.

5. A compound according to claim 1, in which $R_1$ represents unsubstituted, halogen, lower alkyl and lower alkoxy substituted benzyl groups; $R_2$ is a member of the class consisting of unsubstituted, halogen and $C_1$–$C_3$ alkyl substituted phenyl radicals; and pharmaceutically acceptable salts; and esters of the compound of the Formula I with cyanomethanol, benzyl alcohol and $C_1$–$C_6$ alcanols.

6. A compound according to claim 1, in which $R_1$ represents a phenethyl group; $R_2$ is a member of the class consisting of unsubstituted, halogen and $C_1$–$C_3$ alkyl substituted phenyl radicals; and pharmaceutically acceptable salts; and esters of the compound of the Formula I with cyanomethanol, benzyl alcohol and $C_1$–$C_6$ alcanols.

7. A compound according to claim 1, in which $R_1$ represents a furylmethyl group; $R_2$ is a member of the class consisting of unsubstituted, halogen and $C_1$–$C_3$ alkyl substituted phenyl radicals; and pharmaceutically acceptable salts; and esters of the compound of the Formula I with cyanomethanol, benzyl alcohol and $C_1$–$C_6$ alcanols.

8. A compound according to claim 1, in which $R_1$ represents a pyridyl ethyl group; $R_2$ is a member of the class consisting of unsubstituted, halogen and $C_1$–$C_3$ alkyl substituted phenyl radicals; and pharmaceutically acceptable salts; and esters of the compound of the Formula I with cyanomethanol, benzyl alcohol and $C_1$–$C_6$ alcanols.

9. 5 - benzylamino - 6 - carboxy-3-phenyl-1,2-benzisothiazole-1,1-dioxide and pharmaceutically acceptable salts and esters thereof.

10. 4 - benzylamino - 6 - carboxy-3-phenyl-1,2-benzisothiazole-1,1-dioxide and pharmaceutically acceptable salts and esters thereof.

11. 4 - benzylamino-6-carboxy-3-(4'-methylphenyl-1,2-benzisothiazole-1,1-dioxide and pharmaceutically acceptable salts and esters thereof.

12. 4 - benzylamino - 6 - carboxy-3-(2',4'-dimethylphenyl)-1,2-benzisothiazole-1,1-dioxide and pharmaceutically acceptable salts and esters thereof.

13. 4 - benzylamino-6-carboxy-3-(4' - chlorophenyl)-1,2-benzisothiazole-1,1-dioxide and pharmaceutically acceptable salts and esters thereof.

14. 4 - alkylamino - 6 - carboxy-3-phenyl-1,2-benzisothiazole-1,2-dioxide and pharmaceutically acceptable salts and esters thereof.

15. 4-n-butylamino - 6 - carboxy-3-phenyl-1,2-benzisothiazole - 1,1 - dioxide and pharmaceutically acceptable salts and esters thereof.

16. 4-n-pentylamino-6-carboxy - 3 - phenyl-1,2-benzisothiazole-1,1-dioxide and pharmaceutically acceptable salts and esters thereof.

17. 6 - carboxy - 3 - phenyl-4-(2-pyridyl-(4)-ethylamino)-1,2-benzisothiazole-1,1-dioxide and pharmaceutically acceptable salts and esters thereof.

18. 6 - carboxy - 4 - (furyl-(2)-methylamino)-3-phenyl-1,2-benzisothiazole-1,1-dioxide and pharmaceutically acceptable salts and esters thereof.

19. 5-n-butylamino-6-carboxy-3-phenyl - 1,2 - benzisothiazole-1,1-dioxide and pharmaceutically acceptable salts and esters thereof.

20. 5-n-pentylamino-6-carboxy-3-phenyl - 1,2 - benzisothiazole-1,1-dioxide and pharmaceutically acceptable salts and esters thereof.

21. 5-isoamylamino - 6 - carboxy-3-phenyl-1,2-benzisothiazole-1,1-dioxide and pharmaceutically acceptable salts and esters thereof.

22. 5 - (3' - methoxypropylamino)-6-carboxy-3-phenyl-1,2-benzisothiazole-1,1-dioxide and pharmaceutically acceptable salts and esters thereof.

23. 5 - (4' - chlorobenzylamino)-6-carboxy-3-phenyl-1,2-benzisothiazole-1,1-dioxide and pharmaceutically acceptable salts and esters thereof.

24. 5 - (4' - methoxybenzylamino)-6-carboxy-3-phenyl-1,2-benzisothiazole-1,1-dioxide and pharmaceutically acceptable salts and esters thereof.

25. 5 - (3' - methylbenzylamino)-6-carboxy-3-phenyl-1,2-benzisothiazole-1,1-dioxide and pharmaceutically acceptable salts and esters thereof.

26. 5 - ($\beta$-phenylethylamino) - 6 - carboxy-3-phenyl-1,2-benzisothiazole-1,1-dioxide and pharmaceutically acceptable salts and esters thereof.

27. 5 - (pyridyl - (3) - methylamino)-6-carboxy-3- phenyl-1,2-benzisothiazole-1,1-dioxide and pharmaceutically acceptable salts and esters thereof.

28. 5 - (furyl - (2) - methylamino)-6-carboxy-3-phenyl-1,2-benzisothiazole-1,1-dioxide and pharmaceutically acceptable salts and esters thereof.

29. 5 - benzylamino - 6 - carboxy-3-(3'-chlorophenyl)-1,2-benzisothiazole-1,1-dioxide and pharmaceutically acceptable salts and esters thereof.

References Cited

UNITED STATES PATENTS 3,673,200   6/1972   Baker et al. _____ 200—301

U.S. Cl. X.R.

260—301, 517